United States Patent [19]

Primicerio et al.

[11] 3,907,109

[45] Sept. 23, 1975

[54] CONTAINER FOR REELED FILM OR MAGNETIC TAPE

[75] Inventors: Fernando Primicerio; Vincenzo Rispoli, both of Naples, Italy

[73] Assignee: Minnesota Mining and Manufacturing Company, St. Paul, Minn.

[22] Filed: Apr. 17, 1974

[21] Appl. No.: 461,729

[30] Foreign Application Priority Data

Apr. 27, 1973 Italy .................................. 49698/73

[52] U.S. Cl. .................................. 206/406; 220/324

[51] Int. Cl.² .......................................... B65D 85/67

[58] Field of Search ........... 206/403, 404, 405, 406, 206/408; 220/315, 323, 324, 326

[56] References Cited

UNITED STATES PATENTS

| | | | |
|---|---|---|---|
| 2,866,574 | 12/1958 | Roumeliotis | 220/306 |
| 3,369,653 | 2/1968 | Edwards | 206/406 |
| 3,552,551 | 1/1971 | Goldberg et al. | 220/324 X |
| 3,753,490 | 8/1973 | Mowrey | 206/406 X |
| 3,825,110 | 7/1974 | Halbich et al. | 220/324 X |

*Primary Examiner*—William I. Price
*Assistant Examiner*—Steven E. Lipman
*Attorney, Agent, or Firm*—Alexander, Sell, Steldt & DeLaHunt

[57] ABSTRACT

A pair of notched and tapered latch keys (12, 12') projecting from the base (10) of a reel container lock onto the cover (11) which can be removed from the base by squeezing the latch keys together and lifting the cover in one continuous motion. Each of the cover, including a handle (16), and the base, including the latch keys, can be molded as a single plastic piece.

7 Claims, 3 Drawing Figures

CONTAINER FOR REELED FILM OR MAGNETIC TAPE

FIELD OF THE INVENTION

The present invention concerns an improvement in containers for reels of tape such as magnetic tape or microfilm. More particularly, the present invention concerns a container suitable for storing computer magnetic tape reels.

BACKGROUND OF THE INVENTION

A variety of commercially available containers provide good protection for reels of computer tape, but they employ complex and expensive latching mechanisms. Some of these containers can be conveniently opened only by using both hands. Typical computer tape containers are shown in U.S. Pat. Nos. 3,138,250 and 3,369,653.

THE PRESENT INVENTION

The container of the present invention provides comparable protection for reels of computer tape, but at greatly reduced cost. This economy is achieved by a locking mechanism which permits forming each of the cover and base of the container of a single piece of plastic material, thus greatly reducing the number of parts as compared to the prior art and eliminating costly assembly operations.

Like many computer tape reel containers of the prior art, the novel reel container comprises a base and a cover, each of which comprises a generally flat sidewall and upstanding inner and outer cylindrical rims which cooperate to provide an annular space for receiving and positioning a reel. The sidewall of the cover has a recessed portion within its inner rim to provide for a handle and parts of the locking mechanism so that nothing need extend beyond the cover sidewall. Thus as in the prior art, a number of the containers may be stacked upon each other.

The container of the present invention is characterized by the feature that projecting from the central portion of the base sidewall are at least a pair of opposed latch keys, each having a notch which mates with a latch plate at the recessed portion of the cover to latch the cover to the base. The latch keys are resiliently movable toward each other and project beyond the recessed portion of the cover sufficiently to enable one's fingers to squeeze them together to release the notches in order to open the container. The recessed portion of the cover may be formed with a central opening, the edges of which serve as the latch plates. Preferably the outer surfaces of the latch keys are tapered beyond the notches to a normal spacing less than the breadth of said central opening to facilitate latching the cover to the base.

A handle within the recessed portion of the cover may be formed with a pair of openings, each of which is contiguous with said central opening and receives the portion of a latch key which projects beyond the recessed portion of the cover. The handle may bridge said openings so that the projecting portions of the latch keys can be squeezed and the cover lifted in one continuous motion of the fingers.

THE DRAWING

Figure 1:
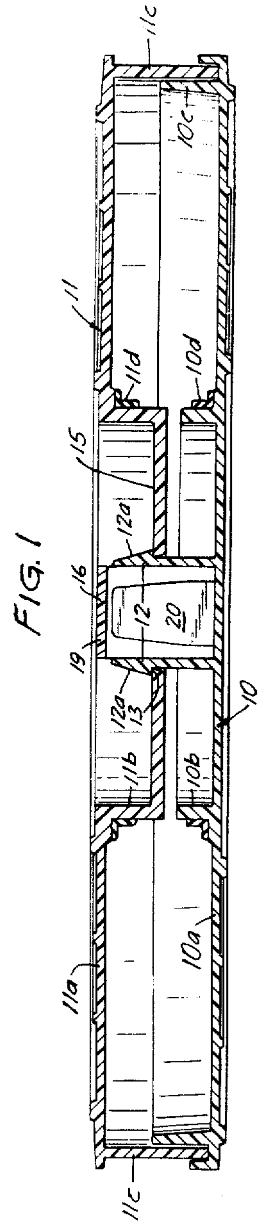
FIG. 1 is a cross section along the diameter of a container of the present invention.

Referring now to the drawings, the container shown in FIG. 1 comprises a dished base 10 and a dished cover 11, each having a generally flat sidewall 10*a* and 11*a* and upstanding inner and outer cylindrical rims 10*b*, 10*c* and 11*b*, 11*c* which cooperate to provide an annular space for receiving and positioning a reel (not shown). Fitted around each of the inner rims 10*b* and 11*b* is a resilient ring 10*d* and 11*d* for cushioning a stored reel.

Projecting from the circular central portion of the base 10 are a pair of opposed latch keys 12, each of which has a notch 13 that fits into a central opening 14 in the annular recessed portion 15 of the sidewall 11*a* of the cover 11. The outer surfaces 12*a* of the latch keys 12 projecting beyond the notches 13 are tapered inwardly to a spacing less than the breadth of the opening 14.

To latch the cover to the base, the central opening 14 in the cover 11 is placed over the latch keys 12 and pressed against the base 10, thus resiliently squeezing the latch keys together until they snap out to the latched position shown in FIG. 1, in which position the edges of the central opening 14 provide latch plates for the latch keys 12.

Figure 2:
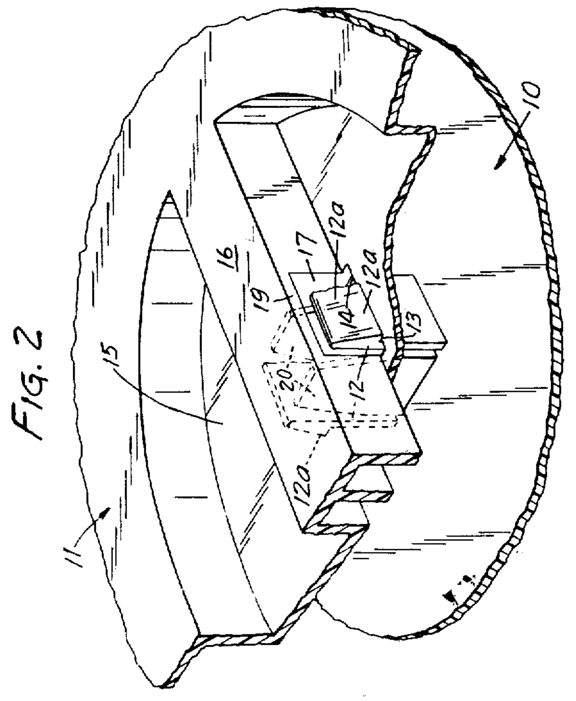
FIG. 2 is an enlarged perspective view of the central portion of the container shown in FIG. 1, partly cut away to show certain detail.

Across the diameter of the recessed portion 15 of the cover is a box-like handle 16 which, as seen in FIG. 2, is formed with a pair of openings 17, each of which is contiguous with the central openings 14. The openings 17 receive the portions of the latch keys 12 which project beyond the recessed portion 15 of the cover when the container is closed. The handle 16 is of generally E-shaped cross section and has a bridge 19 over the openings 14 and 17 so that the projecting outer surfaces 12*a* of the latch keys 12 can be squeezed and the cover lifted off the base in one continuous motion of the fingers. A pair of stops 20 prevent the latch keys from being flexed beyond the elastic limit.

In the embodiment illustrated in FIGS. 1 and 2, the latch keys 12 and stops 20 are molded with the base 10 as a single plastic piece, and the cover 11 and handle 16 are molded as another single plastic piece. In a prototype, the base and latch keys were molded of opaque polystyrene which provides sufficient strength and resiliency for the latch keys, and the cover and handle were molded of transparent polystyrene to permit inspection of a stored reel of tape without opening the container.

As shown in FIG. 2, the recessed portion of the cover 11 and the handle 16 are continuous except at the pair of openings 17 in the handle, and the opposed latch keys 12 nearly fill said openings 17 when the cover is latched to the base 10 to restrict the flow of air through the openings 17 and the central opening 14 in the base. Nevertheless, it is impractical to make the container dust-tight, and plastic dust generated at the latching site which drops through the central opening 14 may have a contaminating effect.

Figure 3:
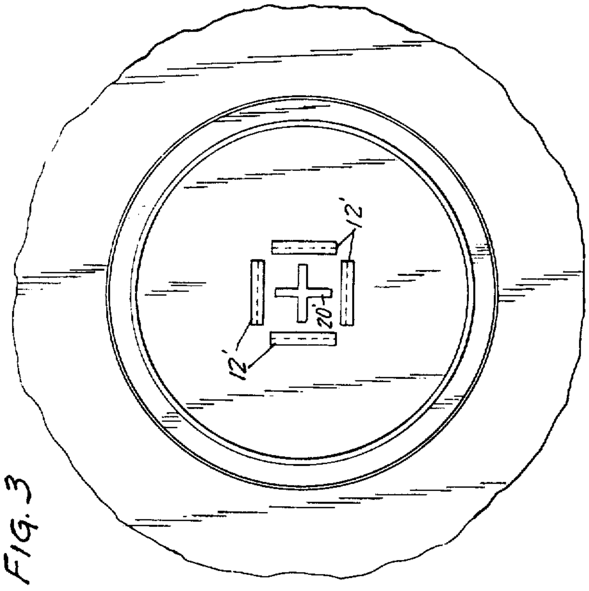
FIG. 3 is a top plan view of the central portion of the base of a preferred container of the present invention.

FIG. 3 shows the central portion of the base of another container embodying the invention. Four latch keys 12', each identical to latch keys 12 of the container shown in FIGS. 1 and 2, are positioned in pairs offset 90° with respect to each other. A cross-shaped stop 20' prevents the latch keys from being flexed too far. Either pair of the latch keys 12' can be fitted into the central opening 14 of the cover 11 so that the cover need not be rotated more than 45° from any position to latch it to the base. Of course, the webs reinforcing the handle 16 would necessarily be designed to receive the unused latch keys.

The present invention has been described with reference to presently preferred embodiments. It will be understood that those skilled in the art, in carrying out the invention, can resort to changes and modifications without departing from the spirit and scope of the appended claims.

We claim:

1. A reel container comprising a base and a cover, each of which comprises a generally flat sidewall and upstanding inner and outer cylindrical rims which cooperate to provide an annular space for receiving and positioning a reel, the sidewall of the cover having an annular recessed portion within its inner rim and a handle across the diameter of the recessed portion, characterized in that:

projecting from and integral with the central portion of the base sidewall are at least a pair of opposed latch keys, the outer surface of each having a notch which mates with a latch plate provided by a central opening in the recessed portion of the cover to latch the cover to the base, the latch keys are resiliently movable toward each other and project beyond the recessed portion of the cover sufficiently to enable one's fingers to squeeze them together to release the notches from the latch plates, and the handle is box-like and each of its sides is formed with an opening for receiving the portion of one of the latch keys which projects beyond the recessed portion of the cover when the container is closed so that said projecting portions can be squeezed and the cover lifted off the base in one continuous motion.

2. Container according to claim 1 further characterized in that: a second pair of opposed latch keys projects from the central portion of the base offset 90° with respect to the first pair, the recessed portion of the cover has only two latch plates for receiving either pair of latch keys, and the cover need not be rotated more than 45° from any position to latch it to the base.

3. Container according to claim 1 further characterized in that: the outer surfaces of the pair or pairs of latch keys are tapered beyond the notches to a spacing less than the breadth of said central opening to facilitate latching the cover to the base.

4. Container according to claim 1 further characterized in that: the recessed portion of the cover and the handle are continuous except at said pair of openings in the handle and the opposed latch keys virtually fill said openings when the cover is latched to the base to restrict the flow of air through those openings and the central opening in the base.

5. Container according to claim 1 further characterized in that: the cover and handle are molded as a single plastic piece.

6. Container according to claim 1 further characterized in that: the latch keys are molded with the base as a single plastic piece.

7. Container according to claim 1 further characterized in that: projecting from the center of the base is a stop for limiting the movement of the latch keys.

* * * * *